United States Patent
Badger, II et al.

(10) Patent No.: US 11,548,351 B2
(45) Date of Patent: Jan. 10, 2023

(54) SYSTEMS AND METHODS FOR LIMITING REMOTE START FUNCTIONALITY ON VEHICLES

(71) Applicant: FORD GLOBAL TECHNOLOGIES, LLC, Dearborn, MI (US)

(72) Inventors: Charles Everett Badger, II, Westland, MI (US); Brandon Beauvais, Dearborn, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 392 days.

(21) Appl. No.: 16/778,623

(22) Filed: Jan. 31, 2020

(65) Prior Publication Data

US 2021/0237534 A1    Aug. 5, 2021

(51) Int. Cl.
  *B60H 1/00*    (2006.01)
(52) U.S. Cl.
  CPC ..... *B60H 1/00735* (2013.01); *B60H 1/00657* (2013.01)
(58) Field of Classification Search
  CPC ... B60H 1/00657; B60H 1/00735; B60L 1/02; B60L 2240/34; B60L 2260/56; B60L 3/0023; B60L 58/12; B60R 16/03; F02N 11/0807; F02N 11/10; F02N 2200/061; F02N 2200/08; G06Q 50/30; H04W 4/40; G07C 5/008; Y02T 10/70
  See application file for complete search history.

(56) References Cited

U.S. PATENT DOCUMENTS

| | | | | |
|---|---|---|---|---|
| 4,236,594 A * | 12/1980 | Ramsperger | ........ | F02N 11/0807 701/2 |
| 4,345,554 A * | 8/1982 | Hildreth | ............ | B60H 1/00642 290/37 R |
| 4,392,059 A * | 7/1983 | Nespor | ................ | F02N 11/101 290/38 C |
| 5,042,439 A * | 8/1991 | Tholl | ................. | F02N 11/0807 290/38 C |
| 5,656,868 A * | 8/1997 | Gottlieb | ............ | F02N 11/0807 307/10.6 |
| 5,736,935 A * | 4/1998 | Lambropoulos | ... | G07C 9/00309 340/426.36 |
| 5,874,785 A * | 2/1999 | Liu | ........................ | B60R 25/04 123/179.2 |
| 6,561,151 B1 * | 5/2003 | Wisnia | ............... | F02N 11/0848 123/179.2 |
| 6,791,202 B2 * | 9/2004 | McCullough | ....... | F02N 11/0807 307/10.6 |
| 7,349,798 B2 * | 3/2008 | Beyene | ................. | F02N 15/10 701/115 |
| 8,096,482 B2 | 1/2012 | Dage | | |

(Continued)

FOREIGN PATENT DOCUMENTS

WO    2019/099033 A1    5/2019

*Primary Examiner* — Tyler J Lee
(74) *Attorney, Agent, or Firm* — David B. Kelley; Carlson, Gaskey & Olds, P.C.

(57) ABSTRACT

This disclosure describes systems and methods for limiting the functionality of remote start systems within vehicles. Remote start operations may be limited, for example, in response to exceeding one or more remote start limits. Limiting the remote start operations may include either preventing the initiation of a remote start request or ending an already in-progress remote start operation.

20 Claims, 5 Drawing Sheets

(56) References Cited

U.S. PATENT DOCUMENTS

| | | | | |
|---|---|---|---|---|
| 8,479,706 B2* | 7/2013 | Speers | .................... | F02M 3/00 |
| | | | | 123/339.14 |
| 9,205,826 B2* | 12/2015 | Lee | .................... | B60R 1/00 |
| 9,403,417 B2* | 8/2016 | Proefke | ............. | B60H 1/00657 |
| 9,500,156 B2* | 11/2016 | Takahashi | ............... | F02D 45/00 |
| 9,807,547 B1* | 10/2017 | Oesterling | ............. | H04W 4/80 |
| 10,059,167 B2 | 8/2018 | Rustoni | | |
| 2004/0178050 A1* | 9/2004 | Wylde | ................ | F02N 11/0807 |
| | | | | 74/335 |
| 2011/0030639 A1* | 2/2011 | Kwiecinski | ........... | F02N 11/101 |
| | | | | 123/179.2 |
| 2013/0073121 A1* | 3/2013 | Kim | .................... | B60R 25/209 |
| | | | | 701/2 |
| 2013/0151037 A1* | 6/2013 | Harumoto | .......... | B60H 1/00657 |
| | | | | 701/2 |
| 2013/0268139 A1* | 10/2013 | Endo | .................... | F02N 11/101 |
| | | | | 701/2 |
| 2014/0371951 A1* | 12/2014 | Michael | ............. | F02N 11/0807 |
| | | | | 701/2 |
| 2018/0126849 A1* | 5/2018 | Kanagaraj | ............... | B60R 25/04 |
| 2019/0287080 A1* | 9/2019 | Penilla | .................... | G06F 9/00 |

* cited by examiner

SYSTEMS AND METHODS FOR LIMITING REMOTE START FUNCTIONALITY ON VEHICLES

TECHNICAL FIELD

This disclosure relates to vehicles, and more particularly to systems and methods for limiting remote start operations within vehicles when one or more predefined remote start limits are violated.

BACKGROUND

Vehicle users may desire to pre-condition (i.e., heat or cool) the passenger cabin of the vehicle prior to entering and driving the vehicle. The pre-conditioning can be initiated via a remote start request while the user is located remotely from the vehicle. The vehicle must use energy that would otherwise be available for vehicle propulsion to power a vehicle climate control system in order to accomplish the pre-conditioning.

SUMMARY

A vehicle according to an exemplary aspect of the present disclosure includes, among other things, a remote start system and a control system configured to automatically limit functionality of the remote start system in response to violating a remote start limit.

In a further non-limiting embodiment of the foregoing vehicle, the control system is configured to prevent an initiation of a remote start operation of the remote start system.

In a further non-limiting embodiment of either of the foregoing vehicles, the control system is configured to end a remote start operation of the remote start system.

In a further non-limiting embodiment of any of the foregoing vehicles, the remote start system is configured to communicate with a personal electronic device via a transceiver.

In a further non-limiting embodiment of any of the foregoing vehicles, the personal electronic device is configured through an application to define the remote start limit.

In a further non-limiting embodiment of any of the foregoing vehicles, the remote start system is configured to communicate a remote notification of the violation of the remote start limit to a personal electronic device.

In a further non-limiting embodiment of any of the foregoing vehicles, the personal electronic device is configured through an application to receive the remote notification.

In a further non-limiting embodiment of any of the foregoing vehicles, the control system includes a plurality of control modules that communicate with one another to limit or enable the functionality of the remote start system.

In a further non-limiting embodiment of any of the foregoing vehicles, the plurality of control modules include a remote start control module, a powertrain control module (PCM), a climate control module, and a battery electric control module (BECM).

In a further non-limiting embodiment of any of the foregoing vehicles, the remote start limit is a state of charge (SOC) threshold associated with a battery pack of the vehicle.

In a further non-limiting embodiment of any of the foregoing vehicles, the remote start limit is a state of charge (SOC) depletion limit associated with a battery pack of the vehicle.

In a further non-limiting embodiment of any of the foregoing vehicles, the remote start limit is a range estimation threshold associated with the vehicle.

In a further non-limiting embodiment of any of the foregoing vehicles, the remote start limit is a range depletion limit associated with the vehicle.

In a further non-limiting embodiment of any of the foregoing vehicles, the remote start limit is a fuel level threshold associated with a fuel tank of the vehicle.

In a further non-limiting embodiment of any of the foregoing vehicles, the remote start limit is a fuel level depletion limit associated with a fuel tank of the vehicle.

A method according to another exemplary aspect of the present disclosure includes, among other things, automatically limiting, via a control system located onboard a vehicle, a remote start operation of the vehicle in response to violating a predefined remote start limit.

In a further non-limiting embodiment of the foregoing method, automatically limiting the remote start operation includes preventing initiation of a remote start request.

In a further non-limiting embodiment of either of the foregoing methods, automatically limiting the remote start operation includes ending an already in-progress remote start operation.

In a further non-limiting embodiment of any of the foregoing methods, the method includes, prior to automatically limiting the remote start operation, communicating a remote notification of the violation of the predefined remote start limit to a user of the vehicle.

In a further non-limiting embodiment of any of the foregoing methods, the method includes, prior to automatically limiting the remote start operation, determining that the vehicle is off-plug.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure describes systems and methods for limiting the functionality of remote start systems within vehicles. Remote start operations may be limited, for example, in response to exceeding one or more remote start limits.

Limiting the remote start operations may include either preventing the initiation of a remote start request or ending an already in-progress remote start operation. These and other features are discussed in greater detail in the following paragraphs of this detailed description.

Figure 1:
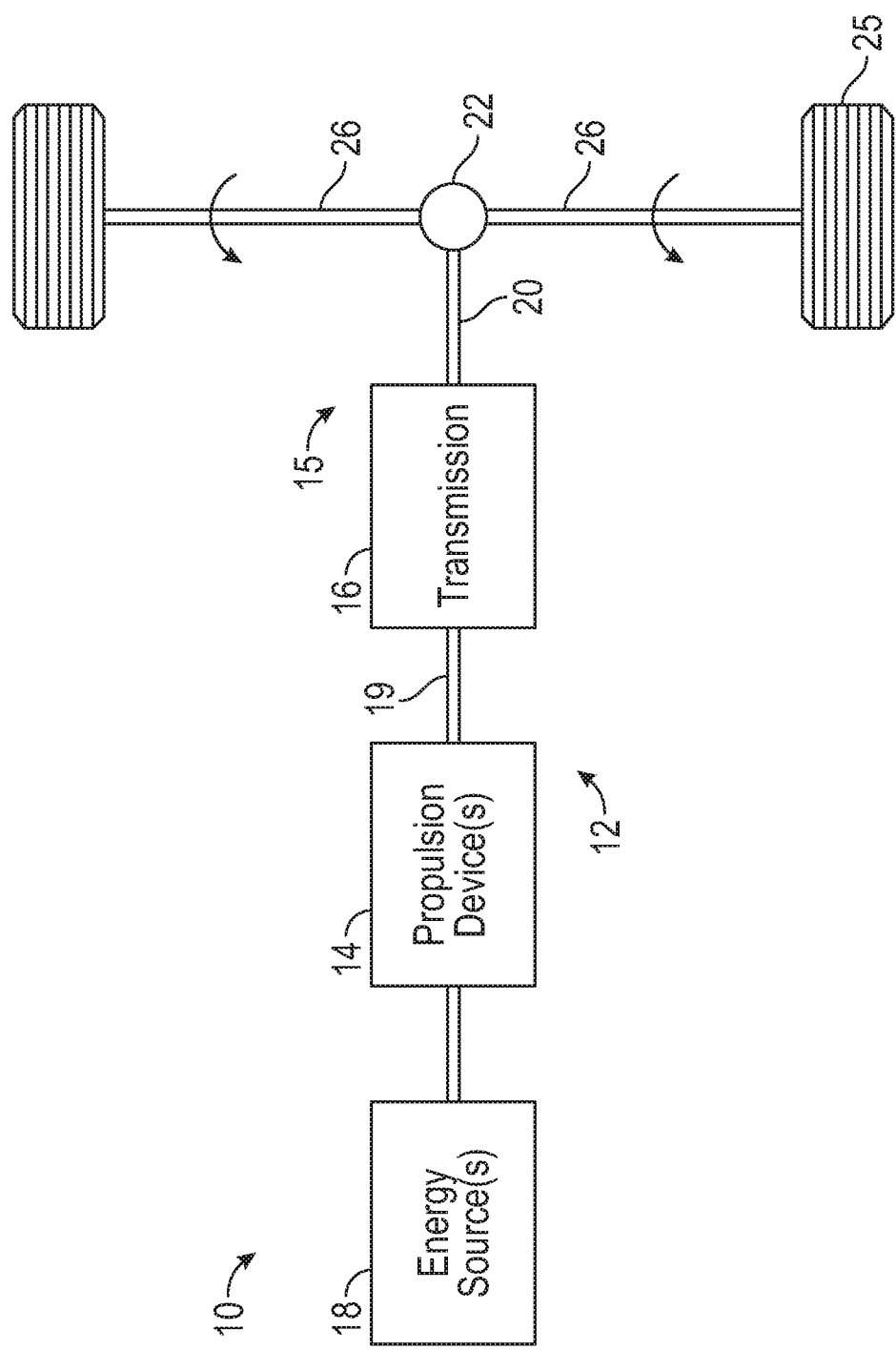
FIG. 1 schematically illustrates a powertrain of a vehicle.

FIG. 1 schematically illustrates a powertrain 10 of a vehicle 12. This disclosure is applicable to any type of vehicle. For example, the vehicle 12 could be a conventional motor vehicle that is powered by an internal combustion engine, a battery electric vehicle (BEV) that is powered by a battery powered electric machine, a hybrid (HEV) or plug-in hybrid (PHEV) vehicle that is powered by one or more electric machines in addition to the internal combustion engine, or a fuel cell vehicle that utilizes an alternative energy source to propel the vehicle 12.

The powertrain 10 may include one or more propulsion devices 14 and a transaxle 15 that is selectively driven by the propulsion device 14. The propulsion devices 14 may be employed as available drive sources for the vehicle 12. In an embodiment, the propulsion device 14 is an internal combustion engine when the vehicle 12 is configured as a conventional motor vehicle. In another embodiment, the propulsion device 14 is an electric machine (i.e., an electric motor, a generator, or a combined motor/generator) when the vehicle 12 is configured as a BEV. In yet another embodiment, the propulsion devices 14 could include both an internal combustion engine and one or more electric machines when the vehicle 10 is configured as a HEV or PHEV.

The transaxle 15 includes a transmission 16. The transmission 16, which is shown schematically, may include a gearbox having multiple gear sets (not shown) that are selectively operated using different gear ratios by selective engagement of friction elements such as clutches and brakes (not shown) to establish the desired multiple discrete or step drive ratios. The friction elements are controllable through a shift schedule that connects and disconnects certain elements of the gear sets to control the ratio between a transmission input shaft 19 and a transmission output shaft 20 of the transaxle 15. The transmission 16 may alternatively be controlled to achieve an infinite number of ratios. The transmission 16 may be automatically shifted from one ratio to another based on various vehicle and ambient operating conditions by an associated control module. The transmission 16 then provides powertrain output torque to the transmission output shaft 20.

The transmission output shaft 20 may optionally be connected to a differential 22 of the transaxle 15. The differential 22 drives a pair of wheels 25 via respective axles 26 that are connected to the differential 22 to propel the vehicle 10. The trans axle 15 may be configured as a front wheel drive, rear wheel drive, or all-wheel drive platform.

One or more energy sources 18 may supply power to the propulsion device(s) 14. The energy source 18 may include a fuel system if the propulsion device 14 is an engine and/or a high voltage traction battery pack if the propulsion device 14 is an electric machine. For example, an engine is configured to consume fuel (i.e., gasoline, diesel, etc.) to produce a motor output, whereas the high voltage traction battery pack is configured to output and receive electrical energy that is consumed by the electric machine to produce a motor output. In an embodiment, the vehicle 10 may include both a fuel system and the high voltage traction battery pack as available energy sources 18 where the vehicle 10 is configured as a HEV or PHEV.

The powertrain 10 of FIG. 1 is highly schematic and is not intended to limit this disclosure. Various additional components could alternatively or additionally be employed by the powertrain 10 within the scope of this disclosure. In addition, the teachings of this disclosure may be incorporated into any type of vehicle, including but not limited to, cars, trucks, vans, sport utility vehicles (SUVs), boats, planes, etc.

Figure 2:
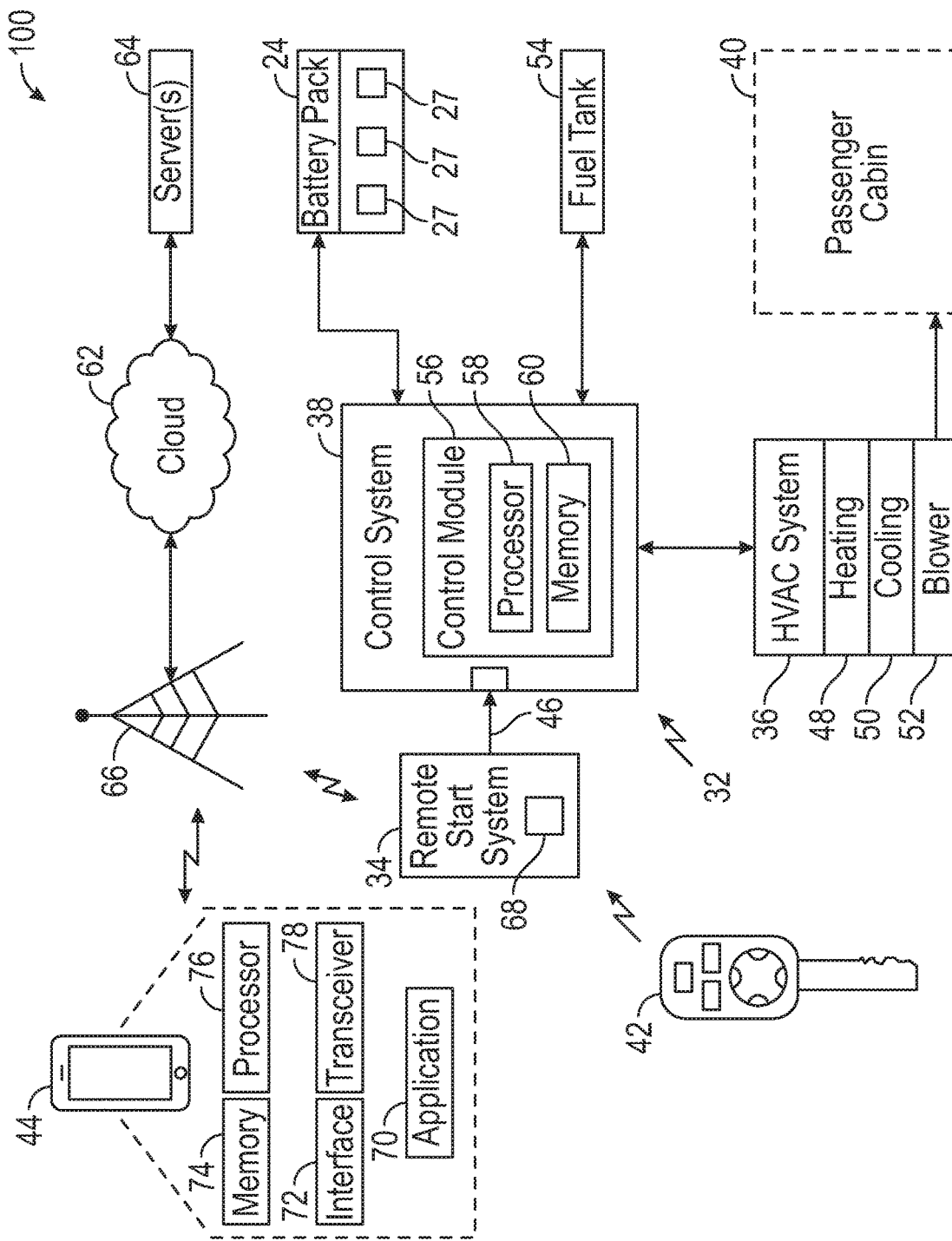
FIG. 2 is a block diagram of a vehicle system.

FIG. 2 schematically illustrates an exemplary vehicle system 32 of the vehicle 12 of FIG. 1. The vehicle system 32 may include, among other things, a remote start system 34, a battery pack 24, a heating, ventilation, and air conditioning (HVAC) system 36, and a control system 38. The battery pack 24 is an exemplary electrified vehicle battery. The battery pack 24 may be a high voltage traction battery pack that includes a plurality of battery arrays 27 (i.e., battery assemblies or groupings of battery cells) capable of outputting electrical power to operate the electric machines and/or other electrical loads of the vehicle 12. Other types of energy storage devices and/or output devices can also be used to electrically power the vehicle 12.

The vehicle system 32 may optionally include energy storage devices in addition to or in place of the battery pack 24. For example, for PHEV or fuel cell implementations, the vehicle system 32 could include the battery pack 24 and a fuel tank 54 for storing a fuel, such as gasoline or hydrogen, and for conventional internal combustion engine driven vehicle implementations, the vehicle system 32 could include only the fuel tank 54.

The vehicle system 32 is capable of limiting the functionality of the remote start system 34 of the vehicle 12 when one or more predefined remote start limits are violated. For example, as further detailed below, the vehicle system 32 may limit the functionality of the remote start system 34 based on remote start limits such as a state of charge (SOC) threshold associated with the battery pack 24, a SOC depletion limit, an estimate range threshold, a range depletion limit, a fuel level threshold associated with the fuel tank 54, and/or a fuel level depletion limit.

The remote start system 34 is configured to coordinate remote start operations of the vehicle 12. A user of the vehicle 12 may make a remote start request while located away from (i.e., exterior from) the vehicle 12 in order to power-up the vehicle 12 and pre-condition (i.e., heat or cool) a passenger cabin 40 of the vehicle 12 prior to entering and driving the vehicle 12. A key fob 42 or a personal electronic device (e.g., a smart phone) 44 may be operated by a user to initiate the remote start operation.

In response to the remote start request, the remote start system 34 may communicate a remote start request signal 46 over a data bus to the control system 38. In an embodiment, the remote start signal 46 includes information pertaining to climate control settings for preconditioning the temperature of the passenger cabin 40 to a desired temperature setting prior to vehicle use. The control system 38 may command the HVAC system 36 to begin preconditioning the passenger cabin 40 in response to receiving the remote start signal 46.

The HVAC system 36 may include a heating element 48, a cooling element 50, and a blower 52. When heating is demanded within the passenger cabin 40, a fluid, such as water or coolant, is communicated to the heating element 48 for exchanging heat with airflow that is blown across the heating element 48 by the blower 52. The fluid loses heat to the airflow, which may then be communicated to heat the passenger cabin 40. Alternatively, when cooling is demanded within the passenger cabin 40, a refrigerant may be communicated to the cooling element 50. The refrigerant is expanded in the cooling element 50 and thus absorbs heat from airflow that is blown across the cooling element 50 by the blower 52. The airflow may then be communicated to cool the passenger cabin 40. In an embodiment, the heating element 48 is a heater core and the cooling element 50 is an evaporator core. However, other heating and cooling devices may also be utilized to heat and/or cool the passenger cabin 40 within the scope of this disclosure. In other words, the specifics of the HVAC system 36 are not intended to limit this disclosure.

The blower 52 may be controlled to cause airflow to flow through the HVAC system 36 and into the passenger cabin 40. In an embodiment, the blower 52 is a variable speed blower for causing airflow to flow into and through the heating and/or cooling elements 48, 50, through ducts and other conduits of the HVAC system 36, and then into the passenger cabin 40. Although not shown in the highly schematic depiction of FIG. 2, the HVAC system 36 could include an arrangement of ducts, conduits, doors, vents, and/or actuators that are employable to direct airflow through either the heating element 48 or the cooling element 50 to adjust the temperature of the airflow.

Powering the HVAC system 36 to precondition the passenger cabin 40 requires using energy from the battery pack 24 (and/or the fuel tank 54) that would otherwise be available for vehicle propulsion. Therefore, it may be desirable to limit the functionality of the remote start system 34 when certain conditions have been met in order to preserve portions of the energy for achieving vehicle propulsion. Limiting the functionality of the remote start system 34 may include preventing initiation of a remote start operation or ending an already in-progress remote start operation early.

The control system 38 may be configured to limit the functionality of the remote start system 34 when certain predefined remote start limits have been violated. The control system 38 may be part of an overall vehicle control system or could be a separate control system that communicates with the vehicle control system. The control system 38 may include one or more control modules 56 equipped with executable instructions for interfacing with and commanding operation of various components of the vehicle system 32. Each control module 56 of the control system 38 may include a processing unit 58 and non-transitory memory 60 for executing the various control strategies and modes of the vehicle system 32, including but not limited to the ability to automatically limit the functionality of the remote start system 34 in response to violating one or more predefined remote start limits. The predefined remote start limits may be set by a user or may be part of the original manufacturing settings of the vehicle 12 which are saved within the memory 60.

Figure 3:
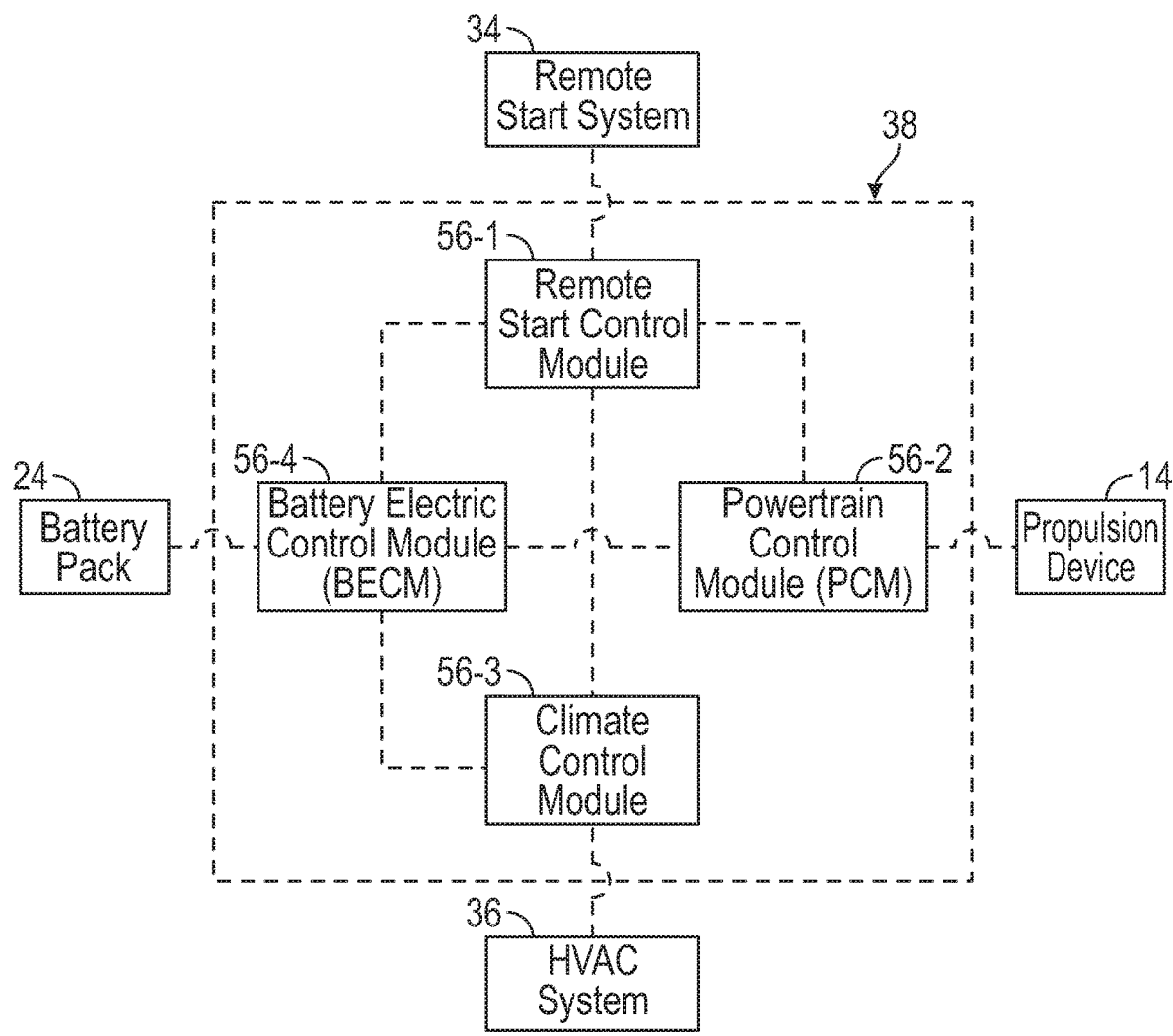
FIG. 3 is a block diagram illustrating an exemplary control system of the vehicle system of FIG. 2.

In an embodiment, as schematically shown in FIG. 3, the control system 38 may include each of a remote start control module 56-1 (i.e., a first control module), a powertrain control module (PCM) 56-2 (i.e., a second control module), a climate control module 56-3 (i.e., a third control module), and a battery electric control module (BECM) 56-4 (i.e., a fourth control module). The control modules 56-1, 56-2, 56-3, and 56-4 are capable of communicating with one another over a data bus to control the remote start operations of the vehicle 12. The total number of control modules employed by the control system 38 is not intended to limit this disclosure, and other control system configurations than the one shown in FIG. 3 are further contemplated within the scope of this disclosure.

The remote start control module 56-1 may be configured, among other things, to communicate with the PCM 56-2, the climate control module 56-3, and the BECM 56-4 in order to either initiate, prevent, or end a remote start operation. The PCM 56-2 may be configured, among other things, to power-up or power-down a propulsion device 14, such as an electric motor and/or engine of the vehicle 12. The climate control module 56-3 may be configured, among other things, to control the operation of the HVAC system 36. The BECM 56-4 may be configured, among other things, to monitor and manage the temperature and SOC of each battery cell of the battery pack 24 and to communicate SOC levels of the battery pack 24 to the remote start control module 56-1, for example.

Referring again to FIG. 2, the remote start system 34 may be configured to communicate over a cloud 62 (i.e., the internet) to obtain various information stored on one or more servers 64. Each server 64 can identify, collect, and store user data associated with the vehicle 12 for validation purposes. Upon an authorized request, data may be subsequently transmitted to the remote start system 34 via a cellular tower 66 or some other known communication technique (e.g., Wi-Fi, Bluetooth, etc.). The remote start system 34 may include one or more transceivers 68 for achieving bidirectional communication with the cellular tower 66. For example, the transceiver 68 can receive data from the servers 64 or can communicate data back to the servers 64 via the cellular tower 66. Although not necessarily shown or described in this highly schematic embodiment, numerous other components may enable bidirectional communication between the vehicle 12 and the web-based servers 64.

Once the personal electronic device 44 has been validated and synced to the vehicle 12, the remote start system 34 may also communicate with the personal electronic device 44 over the bidirectional communication link established between the transceiver 68 and the cellular tower 66. Communications between the remote start system 34 and the personal electronic device 44 may occur over a wireless link, an Internet connection, or some combination of these.

The personal electronic device 44 (e.g., a smart phone, tablet, computer, wearable smart device, etc.) in most implementations belongs to the owner/user of the vehicle 12. The personal electronic device 44 may include an application 70 that includes programming to allow the user to employ a user interface 72 for setting one or more predefined remote start limits for selectively limiting the functionality of the remote start system 34. The application 70 may be stored in memory 74 of the personal electronic device 44 and may be executed by a processor 76 of the personal electronic device 44. The personal electronic device 44 may additionally include a transceiver 78 that is configured to communicate with the transceiver 68 of the remote start system 34 over the cellular tower 66 or some other wireless link. In an alternative embodiment, the key fob 42 may communicate with the remote start system 34 via radio-frequency signals.

The control system 38 may be further configured to communicate a remote notification of a violation of one or more of the predefined remote start limits to the personal electronic device 44 of the user. In response to receiving the remote notification, the user of the vehicle 12 may, via the application 70 of the personal electronic device 44, command operation of the remote start system 34 in a certain manner. For example, the user may utilize the application to 70 instruct the remote start system to proceed with a remote start operation even though one or more of the predefined remote start limits have been violated. Stated another way, the user may override any remote start limit violation.

Figure 4:
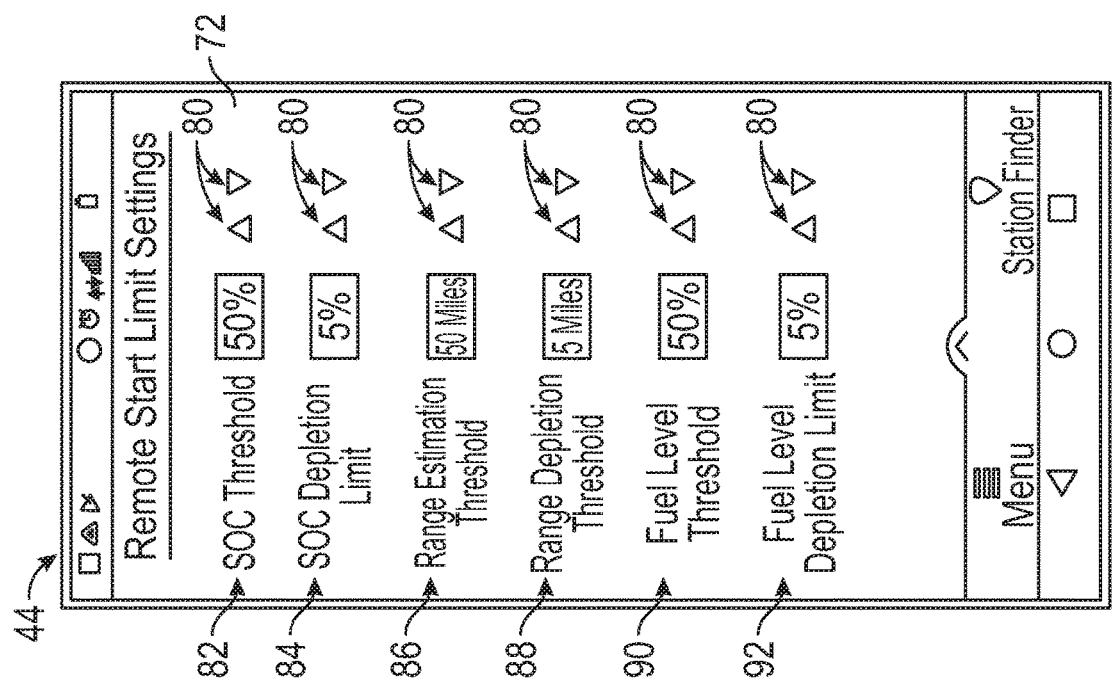
FIG. 4 illustrates an exemplary user interface of a mobile device that may communicate with the vehicle system of FIG. 2.

FIG. 4 illustrates an exemplary user interface 72 of the application 70 of the personal electronic device 44. The user interface 72 may include various features that allow a user to set a plurality of predefined remote start limits. For example, the user interface 72 may include a plurality of toggles 80 that allow the user to modify the various predefined remote start limits. Although shown as toggles, the user interface could employ drop down menus, sliding scales, or any other features or combinations of features that would allow the user to modify the predefined remote start limits.

A first remote start limit that may be set by the user using the user interface 72 for limiting remote start functionality is a SOC threshold 82 associated with the battery pack 24. The SOC threshold 82 represents a SOC level (typically represented as a percentage) below which the functionality of the remote start system 34 will be automatically limited. Stated another way, remote start operations can run so long as the current SOC of the battery pack 24 is at or above the SOC threshold 82.

A second remote start limit that may be set by the user using the user interface 72 is a SOC depletion limit 84 associated with the battery pack 24. The SOC depletion limit 84 represents a limit on how far the SOC of the battery pack 24 is permitted to drop during any given remote start operation.

A third remote start limit that may be set by the user using the user interface 72 is a range estimation threshold 86. The range estimation threshold 86 represents an estimated vehicle range distance below which the functionality of the remote start system 34 will be automatically limited. Stated another way, remote start operations can run so long as the current range estimation of the vehicle 12 is at or above the range estimation threshold 86.

A fourth remote start limit that may be set by the user using the user interface 72 is a range depletion limit 88. The range depletion limit 88 represents a limit on how far the estimated range of the vehicle 12 is permitted to drop during any given remote start operation.

A fifth remote start limit that may be set by the user at the user interface 72 is a fuel level threshold 90 associated with the fuel tank 54. The fuel level threshold 90 represents a fuel level below which the functionality of the remote start system 34 will be automatically limited. Stated another way, remote start operations can run so long as the current fuel level of the fuel tank 54 is at or above the fuel level threshold 90.

A sixth remote start limit that may be set by the user via the user interface 72 is a fuel level depletion limit 92. The fuel level depletion limit 92 represents a limit on how far the fuel level of the fuel tank 54 is permitted to drop during an active remote start operation.

The predefined remote start limits shown in FIG. 4 are exemplary only. Other remote start limits may additionally or alternatively be set and used to limit functionality of the remote start system 34 within the scope of this disclosure.

Figure 5:
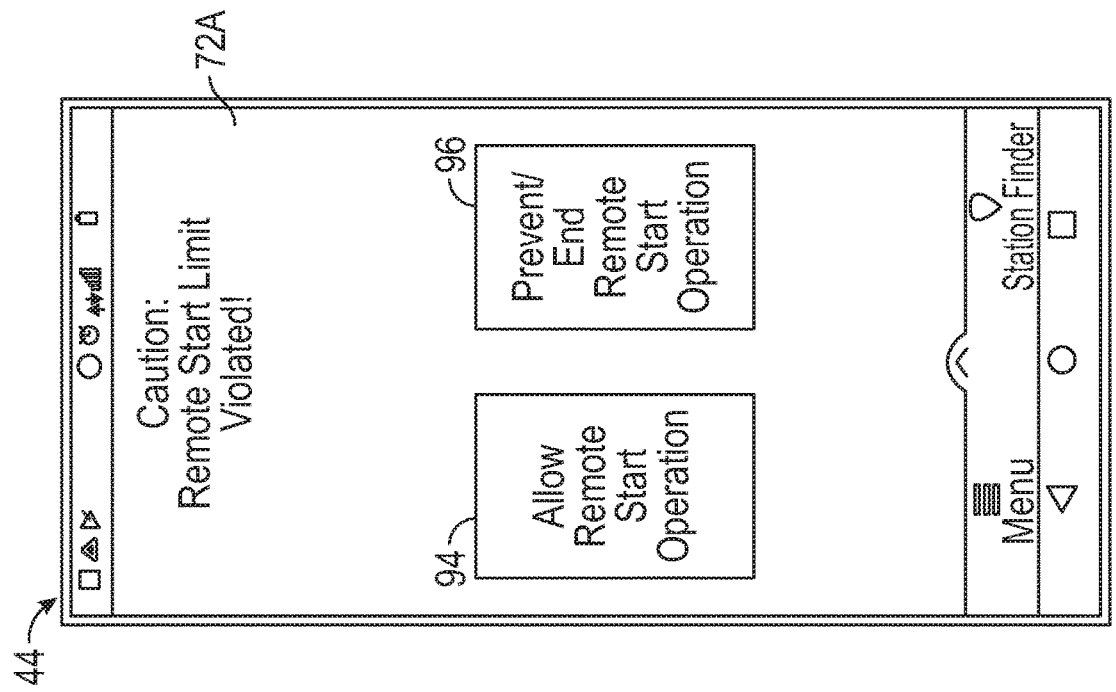
FIG. 5 illustrates another exemplary user interface of a mobile device that may communicate with the vehicle system of FIG. 2.

FIG. 5 illustrates another exemplary user interface 72A that can be presented by the application 70 of the personal electronic device 44. The use interface 72A may be presented to the user on the personal electronic device 44 when one of the predefined remote start limits have been violated. The user interface 72A may give the user the opportunity to override any limit to the functionality of the remote start system 34. For example, the user interface 72A may include a first button 94 and a second button 96. The first button 94 may be pressed or otherwise actuated by the user to allow remote start operations to commence/continue, and the second button 96 may be pressed or otherwise actuated by the user to prevent or end remote start operations.

The user interfaces shown in FIGS. 4-5 are but two non-limiting examples of how the user interface of the application 70 could be configured and presented to the user. Other configurations are also contemplated within the scope of this disclosure.

Figure 6:
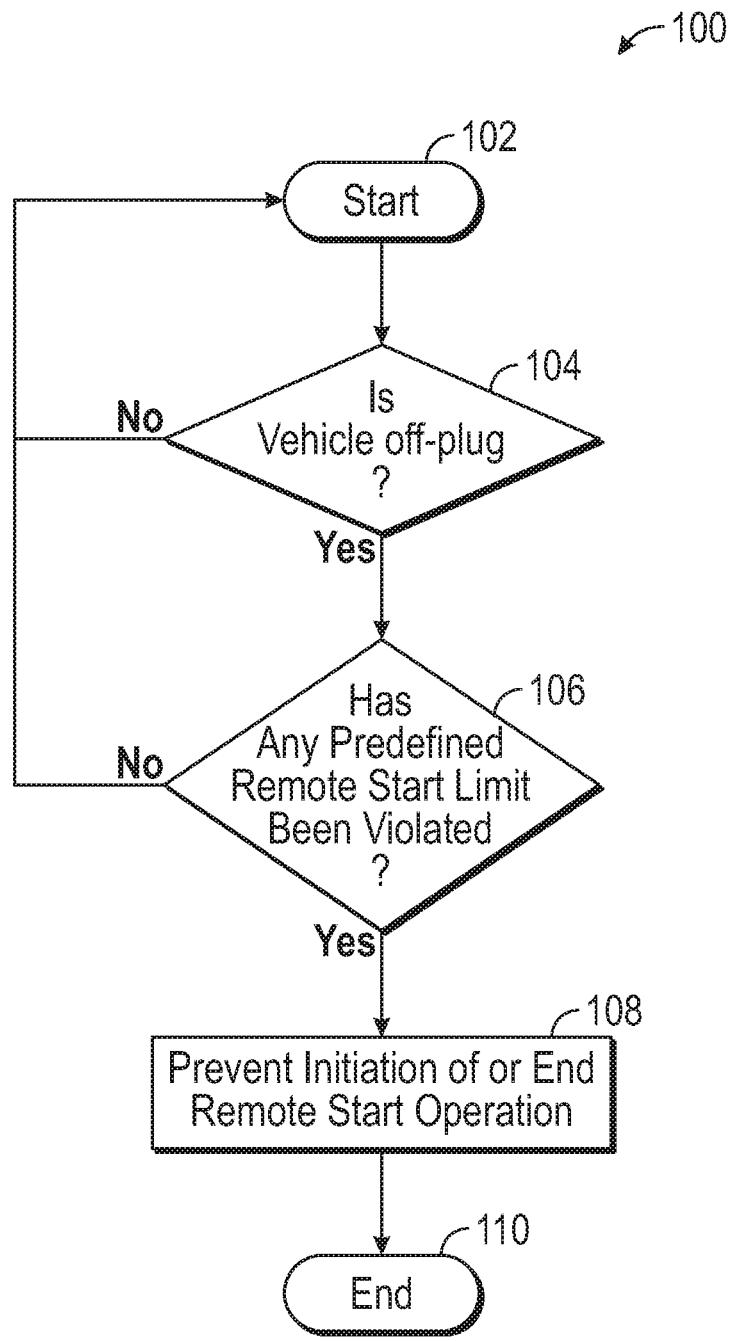
FIG. 6 schematically illustrates a method for limiting remote start functionality within a vehicle.

FIG. 6, with continued reference to FIGS. 1-5, schematically illustrates a method 100 for limiting the functionality of the remote start system 34 of the vehicle system 32 of the vehicle 12. In an embodiment, the control system 38 of the vehicle system 32 is programmed with one or more algorithms adapted to execute the exemplary method 100. Among other benefits, the method 100 allows a user of the vehicle 12 to substantially prevent unexpected vehicle range limitations that can occur because of the loss of energy during vehicle remote-start pre-conditioning events.

The exemplary method 100 may begin at block 102. At block 104, the control system 38 may monitor whether the vehicle 12 is off-plug. It may be unnecessary to limit remote start functionality when the vehicle 12 is on-plug.

If block 104 returns a YES flag, the method 100 may proceed to block 106. The control system 38 may then perform a series of system checks to determine whether any of the predefined remote start limits have been violated (e.g., by comparing current battery pack 24 and/or fuel tank 54 levels to the predefined remote start limits saved in the memory 60 of the control system 38).

If any of the limits are determined to be violated at block 106, the method 100 proceeds to block 108 and the control system 38 prevents initiation of or ends remote start operations. A remote notification may optionally be sent to the user's personal electronic device 44 for confirmation prior to preventing/ending the remote start operations. The method 100 may end at block 110.

The exemplary electrified vehicle systems and methods described above are configured to allow a user to limit the functionality of remote start operations when certain conditions are met. The systems and methods of this disclosure thereby improve the overall customer experience by substantially preventing situations in which the users have less vehicle range than expected in response to running remote start operations.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A vehicle, comprising:
   a remote start system; and
   a control system configured to automatically limit functionality of the remote start system in response to violating a remote start limit,
   wherein the remote start limit includes at least one of a state of charge (SOC) threshold associated with a battery pack of the vehicle, a state of charge (SOC)

depletion limit associated with the battery pack, a range estimation threshold associated with the vehicle, a range depletion limit associated with the vehicle, a fuel level threshold associated with a fuel tank of the vehicle, or a fuel level depletion limit associated with the fuel tank.

2. The vehicle as recited in claim 1, wherein the control system is configured to prevent an initiation of a remote start operation of the remote start system.

3. The vehicle as recited in claim 1, wherein the control system is configured to end a remote start operation of the remote start system.

4. The vehicle as recited in claim 1, wherein the remote start system is configured to communicate with a personal electronic device via a transceiver.

5. The vehicle as recited in claim 4, wherein the personal electronic device is configured through an application to define the remote start limit.

6. The vehicle as recited in claim 1, wherein the remote start system is configured to communicate a remote notification of the violation of the remote start limit to a personal electronic device.

7. The vehicle as recited in claim 6, wherein the personal electronic device is configured through an application to receive the remote notification.

8. The vehicle as recited in claim 1, wherein the control system includes a plurality of control modules that communicate with one another to limit or enable the functionality of the remote start system, wherein the plurality of control modules include a remote start control module, a powertrain control module (PCM), a climate control module, and a battery electric control module (BECM).

9. The vehicle as recited in claim 1, wherein the remote start limit is the state of charge (SOC) threshold.

10. The vehicle as recited in claim 1, wherein the remote start limit is the state of charge (SOC) depletion limit.

11. The vehicle as recited in claim 1, wherein the remote start limit is the range estimation threshold.

12. The vehicle as recited in claim 1, wherein the remote start limit is the range depletion limit.

13. The vehicle as recited in claim 1, wherein the remote start limit is the fuel level threshold.

14. The vehicle as recited in claim 1, wherein the remote start limit is the fuel level depletion limit.

15. A method, comprising:
automatically limiting, via a control system located onboard a vehicle, a remote start operation of the vehicle in response to violating a predefined remote start limit,
wherein the predefined remote start limit includes at least one of a state of charge (SOC) threshold associated with a battery pack of the vehicle, a state of charge (SOC) depletion limit associated with the battery pack, a range estimation threshold associated with the vehicle, a range depletion limit associated with the vehicle, a fuel level threshold associated with a fuel tank of the vehicle, or a fuel level depletion limit associated with the fuel tank.

16. The method as recited in claim 15, wherein automatically limiting the remote start operation includes preventing initiation of a remote start request.

17. The method as recited in claim 15, wherein automatically limiting the remote start operation includes ending an already in-progress remote start operation.

18. The method as recited in claim 15, comprising, prior to automatically limiting the remote start operation:
communicating a remote notification of the violation of the predefined remote start limit to a user of the vehicle.

19. The method as recited in claim 15, comprising, prior to automatically limiting the remote start operation:
determining that the vehicle is off-plug.

20. A vehicle, comprising:
a remote start system; and
a control system configured to automatically limit functionality of the remote start system in response to violating a remote start limit,
wherein the remote start limit is a vehicle energy use limit,
wherein the vehicle energy use limit includes a state of charge (SOC) depletion limit associated with a battery pack of the vehicle, a range depletion limit associated with the vehicle, or a fuel level depletion limit associated with a fuel tank of the vehicle.

* * * * *